United States Patent [19]

Drubeck et al.

[11] 4,319,291

[45] Mar. 9, 1982

[54] MAGNETIC TAPE APPARATUS AND METHOD

[75] Inventors: David S. Drubeck, 12043-½ Guerin St., Studio City, Calif. 91604; Malcolm K. Morrett, 13720 E. Valley Blvd., Space #39, La Puente, Calif. 91746

[73] Assignees: David S. Drubeck, Studio City; Malcolm K. Morrett, La Puente, both of Calif.

[21] Appl. No.: 134,292

[22] Filed: Mar. 26, 1980

[51] Int. Cl.³ .................... G11B 15/18; G11B 15/44; G11B 21/08

[52] U.S. Cl. .................................. 360/92; 360/74.1; 360/78

[58] Field of Search ............... 360/92, 91, 96.2, 96.1, 360/78, 71, 74.1, 75, 12

[56] References Cited

U.S. PATENT DOCUMENTS

| | | | |
|---|---|---|---|
| 3,140,360 | 7/1964 | Whitworth | 360/92 |
| 3,285,610 | 11/1966 | Shields | 360/92 |
| 3,533,633 | 10/1970 | Wilder | 360/74.1 |
| 3,641,279 | 2/1972 | Ganske | 360/72.1 |
| 3,647,987 | 3/1972 | Trammell | 360/93 |
| 3,766,326 | 10/1973 | Buchholz | 360/92 |
| 3,825,949 | 7/1974 | Pyles | 360/91 |
| 3,911,487 | 10/1975 | Ladriere | 360/78 |
| 3,946,160 | 3/1976 | Ano | 360/91 |
| 4,101,941 | 7/1978 | Tanaka | 360/78 |

*Primary Examiner*—Alfred H. Eddleman
*Attorney, Agent, or Firm*—Lowe, King, Price & Becker

[57] ABSTRACT

A continuous play, selectable airliner passenger audio program presentation system employs a plurality of substantially identical Philips cassette playback units, located in a common housing. Each of the units includes an individual drive mechanism, such that the cassette tape is reversed automatically when it is wound on one hub. Transducer coils in a head assembly are selectively energized, depending upon the direction in which the cassette tape is driven, so that a stereophonic audio signal is continuously derived. The cassette tape tracks and the head assembly coils are activated during recording and playback operations in a manner reversed from the usual manner. Thereby conventional cassettes produce garbled messages, tending to prevent pilfering of the cassettes and use of unauthorized cassettes. The cassettes are held in situ by a hold down bar on a hinged cover of the housing.

16 Claims, 19 Drawing Figures

MAGNETIC TAPE APPARATUS AND METHOD

TECHNICAL FIELD

The present invention relates generally to magnetic tape playback assemblies and more particularly to a magnetic tape playback assembly including a plurality of audio cassettes selectively connected to plural output devices.

BACKGROUND ART

In certain airliners it is customary to provide passengers with several different audio programs which can be selected by each individual passenger. Each program generally originates from a separate magnetic tape source. At present it is generally the practice to employ so-called endless loop magazines or cartridges as the program source. The endless loop magazines or cartridges are, however, relatively expensive and recently have been plagued by failure because the source of lubricated tape generally employed has not been reliable. Each cartridge or magazine stores a separate endless loop. Typically, from three to ten such cartridges or magazines are provided on an airliner having a passenger audio system. Hence, the expense involved in providing a single airline with a complete set of programs is substantial. Because of the problems associated with the magnetic tapes of the endless loop magazines or cartridges, and the expenses involved, the airlines have been seeking a less expensive, more reliable type of program source. The program source, however, must be compatible with the existing program source with regard to size requirements as well as from an electronics standpoint.

DISCLOSURE OF INVENTION

In accordance with the present invention, the program source includes a multiplicity of playback units mounted in a single housing, which playback units are particularly adapted to receive Philips cassettes. Hence, each of the cassettes includes a casing having a pair of hubs on which tape is wound as well as a first pair of transverse apertures into which the hubs extend and a second pair of transverse apertures for receiving a capstan. Each of the units includes a region for receiving one cassette and drive reels into which the cassette hubs fit. Each of the units also includes a pair of capstans which fit into the second apertures of the cassette and a drive motor connected to drive the reels and therefore the tape. The drive direction of the reels is reversed in response to the tape being wound substantially completely on one of the hubs. Each unit also includes a playback head assembly positioned to engage the tape when the cassette is in the receiving region, as well as a pair of pinch rollers, one on each side of the head. One of the pinch rollers is urged into engagement with the tape during playback so that the tape is squeezed between the pinch roller and capstan. The head assembly includes at least first and second magnetic flux to audio signal transducers which are positioned to transduce first and second audio tracks of the tape. The first and second tracks are recorded so that audio information is derived from them in response to the tape being driven at normal speed in first and second directions. A switch connects the first transducer to the amplifier in response to the tape being driven in the first direction and connects the second transducer to the amplifier in response to the tape being driven in the second direction. In the preferred configuration, the programs are stereophonic and four tracks and transducers are provided. While the tape is being translated in the first direction, the switch connects a pair of the transducers to a pair of audio output amplifiers. While the tape is being translated in the second direction, the switch is activated to connect the third and fourth transducers to the audio output amplifiers.

The audio signals coupled to the amplifiers are supplied to an audio cable having a separate lead connected to be responsive to the audio signal derived from each of the amplifiers. A plurality of audio output devices (preferably stereophonic), one for each passenger location, is provided. At each passenger location a separate switch means selectively connects the leads of the cable to the output device so one pair of the leads is connected to the stereophonic output device at a time.

In a preferred embodiment, the individual units are positioned in the housing in side-by-side relation with each other so that the cassettes, while loaded in the units, are transverse to a longitudinal axis of the housing. Each unit includes a spring mechanism tending to urge the cassette out of the region. To prevent the cassette from being urged out of the region during playback, the housing includes a hinged retaining bar extending in the longitudinal axis direction of the unit across a plurality of the units for simultaneously urging the plural cassettes into the region of the unit during playback.

The cassettes preferably include a transverse notch on an edge remote from an edge having an aperture through which the head assembly projects during playback. The retaining bar mates with the notch so that if all the cassettes do not include the notch they cannot be maintained in the region during playback, i.e., the bar cannot be inserted into the notches so that the top cannot seat on the housing. The notch and bar are preferably asymmetrical with respect to the cassette so that during playback the cassettes must be inserted into the region with the tracks oriented in a particular direction. In particular, in a stereophonic cassette having four tracks, the first and second tracks are inserted into the region so that they are below the third and fourth tracks. Insertion of the cassettes into the region in the wrong direction causes the retaining bar to engage an unnotched portion of the cassette to prevent closure of the top.

Each unit is arranged so that a cassette is held in situ relative to the head assembly by a guide that is fixedly mounted relative to the head assembly. A rack on which are mounted the drive reels and capstan is pivotable relative to the guide and head assembly so that the drive reels and capstans are pivoted away from the cassettes as the cassettes are slid into and removed from the guide, to enable insertion of cassettes into the guide without interference from the drive reels and capstans.

While we are aware of prior art disclosing automotive playback units for cassettes, including features for automatically switching the motor drive direction, and selective connection of transducers to audio output amplifiers, we are unaware of any prior art disclosing multiple Philips cassette units in a single assembly which is adapted to be connected to plural switches for selectively connecting a transduced signal to an audio output device.

Two problems are foreseen in connection with the use of Philips cassettes in airliners. Because of the wide acceptance of cassettes for personal utilization, the cassettes are subject to being pilfered by personnel installing the cassettes into the airliners. In addition, the airlines' personnel are likely to utilize generally commercially available cassettes, which would probably have inferior performance characteristics and would not be able to withstand the temperature variations of a typical commercial airliner. The second problem is obviated to a certain degree by the use of the previously mentioned asymmetrical notch and hinged retaining bar relationship. Cassettes having such an asymmetrical notch and stable temperature characteristics are presently commercially available and are known as certified digital cassettes. The commercially available certified digital cassettes have an asymmetrical notch to assure correct insertion of the cassettes into a digital read-out device, to assure correct direction of a digital bit stream. In the present invention, the asymmetrical notch also assures correct insertion direction of the cassettes into the playback units.

The pilfering and unauthorized cassette utilization problems are also obviated in accordance with the present invention by recording the audio tracks in a backward nature relative to the conventional way in which the tracks are recorded, and by playing the tape in a backward direction. In a normal Philips cassette, first and second audio tracks are adjacent to each other and extend along the tape in a first longitudinal direction to provide left and right stereo programs. Third and fourth audio tracks, parallel to each other as well as the first and second audio tracks, extend along the tape in a second direction, opposite from the first direction. In a first conventional type of playback device, the tape tracks are normally played back past a head assembly including first, second, third and fourth track head pole pieces. The first and second track head pole pieces are simultaneously coupled to an audio output device and then the third and fourth track head pole pieces are simultaneously coupled to the audio output device so that the first and second track head pole pieces are initially coupled to the output device while the first and second tape tracks are moving in the first direction past the first and second track head pole pieces. The third and fourth track head pole pieces are subsequently coupled to the output device while the third and fourth tape tracks are moving in the second direction past the third and fourth track head pole pieces. Such a device is utilized in the automotive cassettes type player previously mentioned. In a second conventional playback device, first and second track head pole pieces are simultaneously coupled to an audio output device while the first and second tape tracks are moving in a first direction past the first and second track head pole pieces with one face of the cassette in an upward position. The first and second track head pole pieces are simultaneously coupled to the output device while the fourth and third tape tracks are moving in a second direction, opposite to the first direction, past the first and second track head pole pieces with the cassette in an inverted position, i.e., so that the face which as previously in an upward position is in a downward position.

In accordance with the present invention, pilfering and the use of unauthorized cassettes are avoided by recording the first and second audio tracks in the second direction and recording the third and fourth audio tracks in the first direction. With such an arrangement, playback of the cassette be either of the two conventional playback devices results in an audio message in reverse sound, resulting in gibberish.

During playback, the first and second tape tracks are initially moved in the second direction past the first and second track head pole pieces while the first and second track head pole pieces are simultaneously coupled to an output device. Subsequently, the third and fourth tape tracks are moved in the first direction past the third and fourth track head pole pieces while the third and fourth track head pole pieces are simultaneously coupled to the output device. Thereby, a true audio signal is derived by utilizing the cassette and playback apparatus of the present invention, but if an attempt is made to use the cassettes in either of the conventional devices, gibberish results. Conversely, attempts to utilize unauthorized, conventional cassette tapes in the present invention result in gibberish.

It is, accordingly, an object of the invention to provide a new and improved multiple program audio playback system.

Another object of the invention is provide a multiple program audio playback system utilizing multiple Philips cassettes which supply programs to multiple listeners, each of whom selects one of the programs.

Another object of the invention is to provide a Philips cassette playback system wherein cassettes which are utilized in the system are not subject to extensive pilfering.

A further object of the invention is to provide a new and improved cassette and method of recording on cassettes so that pilfering and use of unauthorized cassettes in a cassette playback system are obviated to a large extent.

The above and still further objects, features and advantages of the present invention will become apparent upon consideration of the following detailed description of one specific embodiment thereof, especially when taken in conjunction with the accompanying drawings.

BEST MODE FOR CARRYING OUT THE INVENTION

Figure 1:
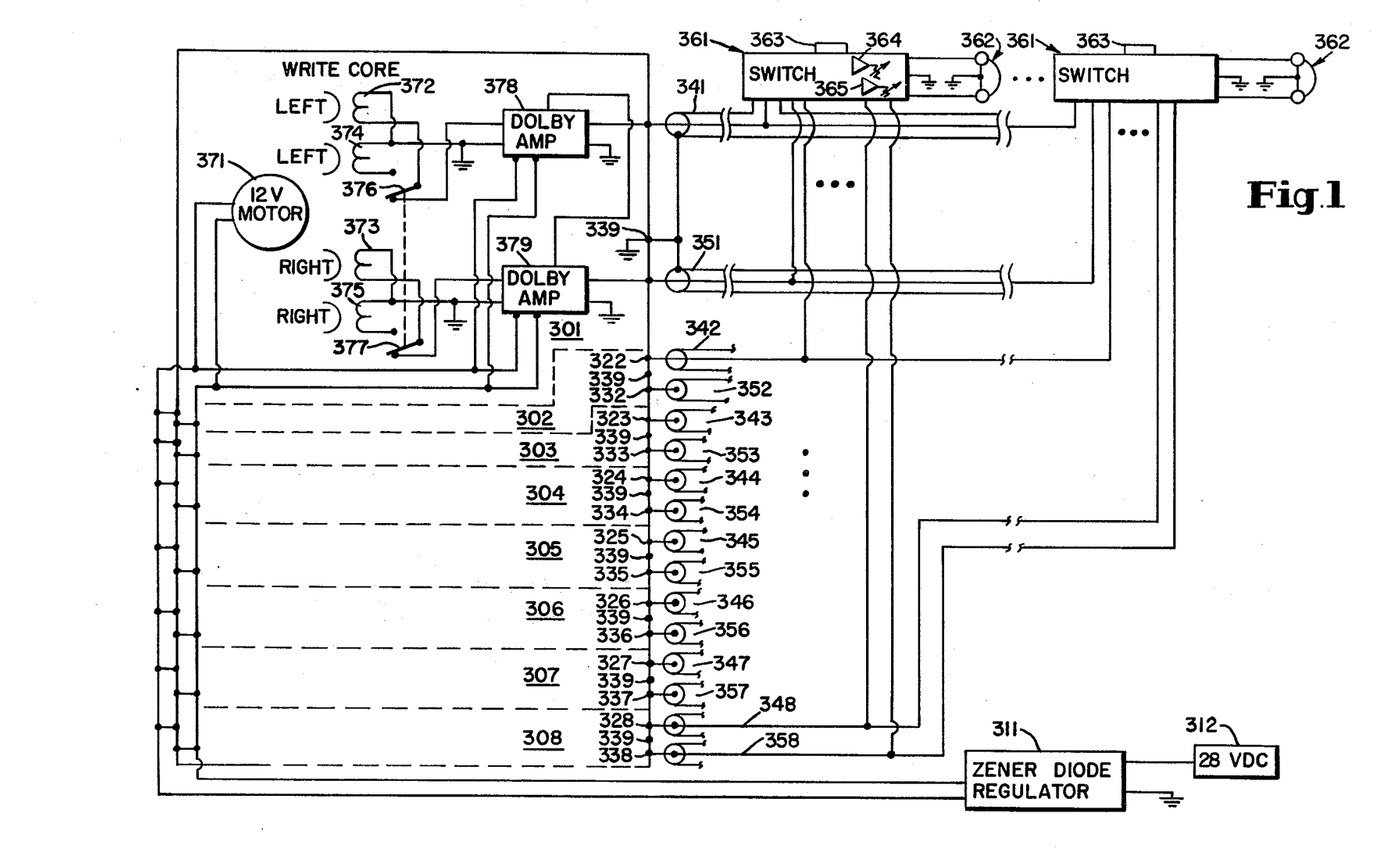
FIG. 1 is a circuit block diagram of a preferred embodiment of the present invention.

Reference is now made to FIG. 1, the system block diagram of a continuous play, selectable airliner passenger audio program presentation system employing eight substantially identical Philips cassette playback units 301-308. All of the playback units 301-308 are driven in parallel by power derived from a 28 volt DC source 312 on board the aircraft. The airline 110 V-400 Hz power source presently employed in many existing airliner passenger audio presentation systems is often a problem in that the 400 Hz is coupled into the audio and is a substantial cause for customer complaint. The 28 V DC is reduced to regulated 12 V DC by zener diode regulator 311. The 28 volt DC source 312 is either internal to the airliner, or is derived from an external, auxiliary supply, while the airliner is on the ground.

Each of units 301-308 constantly derives a stereophonic audio signal at a pair of stereophonic output terminals so that left channel signals are respectively derived from terminals 321-328 of units 301-308 and right channel signals are respectively derived from terminals 331-338 of units 301-308. The signals at terminals 321-328 and 331-338 are referenced to ground terminal 339 and are respectively applied to coaxial cables 341-348 and 351-358. The audio signals supplied to coaxial cables 341-348 and 351-358 are applied to a multiplicity of switches 361, each of which is capable of driving a stereophonic audio output device, such as a pair of stereophonic head phones 362. A switch 361, together with an audio output device, is typically provided at each passenger location within the aircraft. Thus, in a typical aircraft employing an audio entertainment system of the type with which the present invention is employed, there are in excess a 100 switches and audio output devices. Each switch includes a manually controlled knob 363 for selecting an audio signal from one pair of coaxial cables, e.g., from cables 341 and 351, or from cables 342 and 352 . . . cables 348 and 358. The stereophonic signals selected by switch 363 are supplied to a pair of audio amplifiers 364 and 365, for the left and right stereophonic channels. Output signals of amplifiers 364 and 365 are fed through ganged attenuators 366 and 367, to control the volume of the audio stereophonic signals applied to left and right channel electrical to audio transducers of head phones 362.

Because units 301-308 are essentially the same, a description of unit 301 suffices for the remaining units. Unit 301 includes a Philips cassette tape drive mechanism containing 12 volt DC motor 371 that is constantly connected to the DC voltage of regulator 311, wherey motor 371 is constantly driven. Motor 371 drives the tape of a Philips four-channel cassette loaded to unit 301 continuously in a first direction past a head assembly including four ferrite core magnetic flux to electrical signal transducing coils 372-375. When the tape is wound completely on a spool or hug of the cassette, after having been driven in the first direction, the tape is automatically rewound so that it is translated in a second direction past coils 372-375. The tape is driven at the normal playback speed in both directions, e.g., 1.875 inches per second. With the tape being translated in the first direction, signals generated in coils 372 and 373 are respectively coupled via switches 376 and 377 to input terminals of Dolby amplifiers 378 and 379. In response to the tape being driven in the opposite direction, switches 376 and 377 are activated so that signals transduced by coils 374 and 375 are coupled to the input terminals of Dolby amplifiers 378 and 379. Amplifiers 378 and 379 respectively supply left and right channel signals to output terminals 321 and 331 of unit 301. Power is constantly supplied to Dolby amplifiers 378 and 379 by the output of regulator 311.

Figure 2:
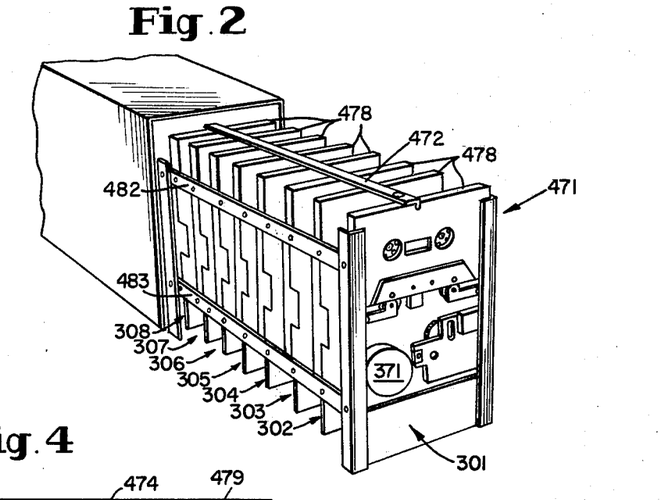
FIG. 2 is a perspective view of an assembly of tape players in accordance with the invention.
Figure 3:
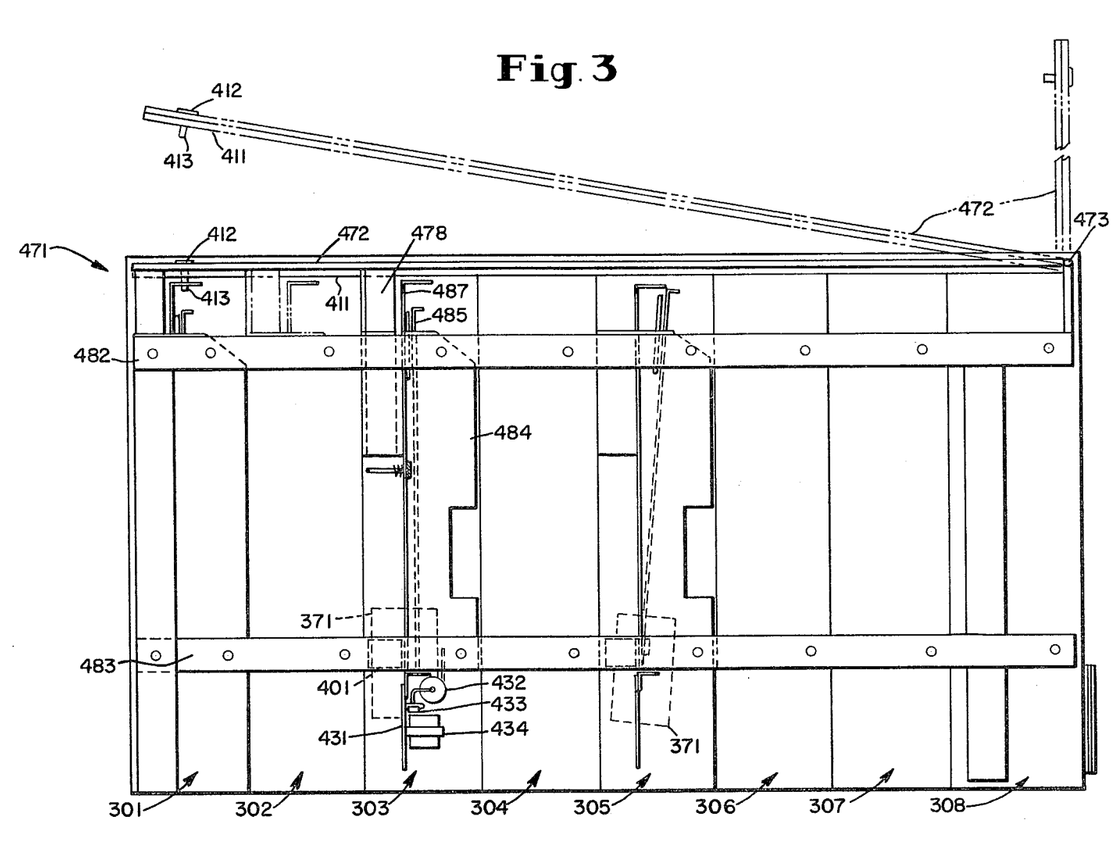
FIG. 3 is a side view of the apparatus illustrated in FIG. 2.

As illustrated in FIGS. 2 and 3, all of units 301-308 are positioned in side-by-side relationship at right angles to the longitudinal axis to and in a common housing 471, in the form of a right parallelepiped, having a top 472 hinged to bar 473 which extends across the top of the parallelepiped, in proximity to one of the edges thereof. Downwardly depending from the inside face of top 472 is a retaining bar 474, FIG. 4, which, in a preferred embodiment, includes a downwardly depending flange 475 to engage off-center rectangular notch 477 of a certified digital computer type Philips cassette 478, which is loaded into each of units 301-308 transverse to the axis of housing 471. Cassettes 478 are preferably of the certified digital type because such cassettes have an offset notch 477 and are fabricated of materials capable of tolerating wide temperture variations, as frequently required in airliners which are left unattended, for example, in temperature environments that may vary anywhere from −35 degrees Fahrenheit to +110 degrees Fahrenheit. Cassettes 478 are loaded into units 301-308 so that all notches 477 are aligned and mate with flange 476 when top 472 is closed. Flange 476 pushes against the bottom surface of notch 477 to drive cassettes 478 into an operative position into each of units 301-308. If an unauthorized cassette is employed that does not include notch 477, flange 476 engaged edge 479 of the cassette remote from edge 380, having an aperture behind which the tape included in the cassette passes and into which head assembly 388 extends during playback. If edge 479 is engaged by flange 476, the remaining cassettes are not driven completely into their associated units 301-308 and closure of hinge top 472 is not possible.

Each of units 301-308 is fixedly mounted, in side-by-side relationship, at different longitudinal positions along the length of housing 471. To this end, housing 471 includes a pair of parallel, metal retaining strips 382 and 383 on the interior of parallel side-walls of the housing. Fixedly mounted to retaining strips 382 and 383 are side flanges 384 of units 301-308, such that the units are vertically mounted in housing 471. Each of units 301-308 includes a pivotable rack 385 (described in detail infra) which carries drive motor 371 and spindles 386, as well as other drive mechanisms associated with the motor and spindle. Mounted to the left of rack 385 is fixed plate 387 which extends in the vertical direction and carries fixed head assembly 388 for transducing coils 372–375, pivotable pinch rollers 389 and 390, and tension sensing pins 392 and 393 which sense when the tape in cassette 378 has been wound completely on one of the cassette spools or hubs 394 and 395 which are driven by spindles 386. Also fixedly mounted on plate 387 is an intermediate arm 396 which is pivotable about a central pin 397, mounted on plate 387. Connected to intermediate arm 396 is an elongated leg 398 which is pivotably mounted on plate 387 to control the position of reversing gear 399, which is fixedly mounted on plate 387 and is in turn driven by trigger mechanism 80. As described infra, reversing gear 399 controls the drive direction between motor 371 and spindles 386, as well as the position of switch contacts 376 and 377, contained in switch housing 401. Pinch rollers 389 and 390 are respectively mounted on pivotable arms 403 and 404, fixedly mounted on plate 387. One of pinch rollers 389 and 390 selectively engages one face of the cassette tape and respectively squeezes the tape against one of capstans 405 and 406 mounted on pivotable rack 385.

As described infra, rack 385 is connected to plate 387 so that the rack can slide up and back from a drive position for cassette 478, to enable the cassette to be inserted into and removed from the rack and the unit; the position of rack 385 when it has been slid upwardly and backward from the drive position is illustrated in FIG. 3, by unit 305. With rack 385 in the position remote from plate 387, as illustrated by unit 305, FIG. 3, cassette 478 can be easily inserted in situ on plate 387 because drive spindles 386 and capstans 405 and 406 are removed from the face of plate 387 against which cassette 478 bears. In response to cassette 478 being fully inserted in place on plate 387, rack 385 is translated and rotated, as described infra, so that spindles 386 and capstans 405 and 406 are inserted into hubs 394 and 395 and apertures 408 of cassette 478. Cassettes 478 are forced into the position which causes rotation and translation of rack 385 in response to engagement of notch 477 by flange 476, as occurs when top 472 is locked into position. To maintain hinge 472 in position, the top includes a bore 411 through which a pair of screws 412 (only one of which is illustrated) extends into a pair of threaded bores 413 in metal strips 414 that extend through the length of housing 471 in proximity to the top edge of the housing, immediately below bar 473 about which top 472 hinges. When screws 412 are threaded into bores 413, bar 474 and its downwardly depending flange 476 hold cassettes 478 of units 301–308 in situ so that the magnetic tapes thereof can be driven.

In response to screws 412 being removed from threaded bores 413, and top 472 being turned upwardly (it can be turn as much as 90 degrees), cassettes 478 of units 301–308 have a tendency to pop upwardly so that they can be easily grapsed by an operator for removal and insertion of another cassette. The upward movement of cassettes 478 frequently causes rack 385 to slide upwardly and completely backwardly from the drive position. At other times, rack 385 may not slide completely upwardly and backwardly from the drive position. Such a situation, however, does not have an adverse effect on removal of cassettes 478 from units 301–308, as racks 385 are easily rotated and translated to a completely withdrawn position in response to an operator pulling slightly on each cassette as it is withdrawn from each of units 301–308.

Figure 4:
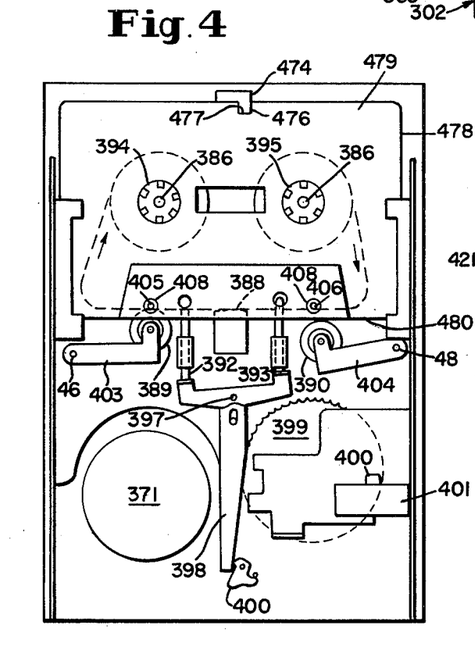
FIG. 4 is a front view of a cassette and a locking bar utilized in connection with the apparatus of FIGS. 2 and 3.
Figure 5:
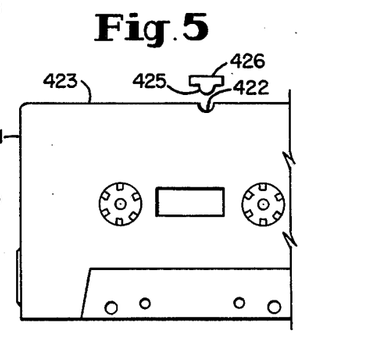
FIG. 5 is a front view of a modification of the apparatus illustrated in FIG. 4.

While a preferred configuration for hold-down bar 474 and cassette 478 is illustrated in FIG. 4, it is to be understood that alternative types of hold-down bars and cassette configurations can be employed, as illustrated in FIG. 5. In particular, in FIG. 5, cassette 421 includes a central, semicircular notch 422 on edge 423, remote from edge 424, which includes an aperture through which head assembly 388 protrudes during playback. Centrally located, semicircular notch 422 mates with a semicircular longitudinally extending protrusion 425, on the bottom face of hold-down bar 426 which is connected to the lower face of top 472 in the same manner that hold-down bar 474 is connected to the top. A cassette as configured in FIG. 5 has the advantage of a cassette of the type illustrated in FIG. 4 because the cassette of FIG. 5 is not generally available and therefore unauthorized cassettes cannot be employed in the system.

In the prior art, it is customary for the right spindle, as viewed in FIG. 4, to drive right hub 395 so that tape is initially paid from left hub 394 onto right hub 395. In many types of machines, when the end of the tape is reached, the cassette is removed from the recording or playback unit and is turned over and the right spindle is again driven. When the type is turned over, tape is paid from hub 395 to hub 394. Such machines generally employ a magnetic head assembly including only two transducing coils positioned in proximity to the upper face of the Philips cassette, and relatively remote from the lower face of the cassette. The upper and lower coils of the assembly supply signals to the left and right stereophonic channels.

In another type of prior art recording and playback device, the head assembly includes four stationary coils, but the cassette need not be turned over when the tape is completely wound on one of the hubs. Instead, the cassette remains in situ and the tape is alternately driven in first and second directions, respectively illustrated in FIGS. 6a and 6b. With the tape driven in the first direction, the upper pair of head pole pieces 441 and 442 is activated to be respectively responsive to the left and right stereophonic channels recorded on the tape. In response to the magnetic tape being completely wound on one of the hubs, the tape direction is reversed, as illustrated in FIG. 6b. With the tape driven in the second direction, as illustrated in FIG. 6b, head pole pieces 443 and 444 are coupled to the stereophonic right and left channels, to the exclusion of heads 441 and 442.

Figure 6A:
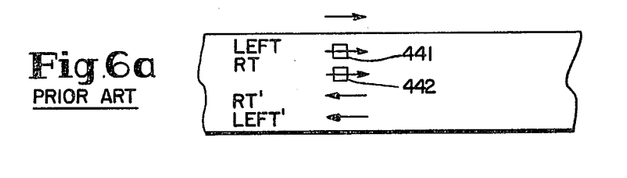
FIGS. 6a and 6b are illustrations indicating the direction of movement of a cassette tape and activation of heads of a playback unit, in accordance with the prior art.
Figure 6B:
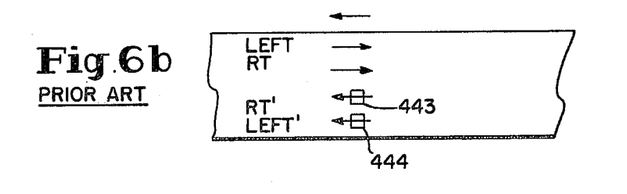

Cassettes, recorders and playback units as described in connection with FIGS. 6a and 6b are readily available. However, if such cassettes are employed in the present invention, they are subject to pilfering. In addition, if the unit of the present invention is compatible with the conventional, prior art, Philips cassette, the airline personnel are apt to use unauthorized cassettes. The use of unauthorized cassettes, however, is likely to have a deleterious effect on the operation of the present invention because the present invention must be capable of operating under widely varying conditions of temperature, pressure and vibration. In addition, it is desirable to control the distribution of cassettes to airliner operators.

To these ends, the tapes and cassettes of the present invention are recorded and played back backward from the conventional Philips cassetts. Thereby, if an attempt is made to pilfer the cassetts in accordance with the present invention, and/or to utilize the cassettes on conventional playback equipment, there is an audio output which is gibberish. Similarly, if an attempt is made to employ conventional cassettes with the present invention, gibberish results.

Figure 7A:
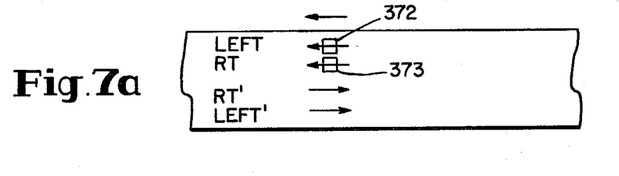
FIGS. 7a and 7b are illustrations of the direction of movement of a cassette tape in accordance with the invention and an indication of the heads which are activated.
Figure 7B:
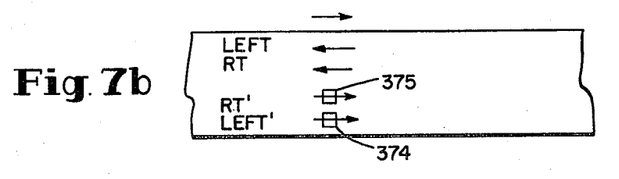

To these ends, the tapes of the present invention are recorded and played back as illustrated in FIGS. 7a and 7b. As illustrated in FIG. 7a, when the tape is transported in the first direction, from right hub 395 to left hub 394, as viewed in FIG. 4, upper coils 372 and 373 for the left and right stereophonic channels are connected via switches 376 and 377 to the input terminals of Dolby amplifiers 378 and 379. When the tape has been completely wound on the left hub 394, the tape direction is reversed, as illustrated in FIG. 7b, and the lower pair of head pole pieces 374 and 375 couples the audio signals recorded on the lower two tracks of the tape of amplifiers 378 and 379 via switch contacts 376 and 377. Of course, the upper left and right tracks are recorded with the tape being paid from the right hub to the left hub, and the lower two tracks are recorded while the tape is being paid from the left cassette hub to the right hub. If cassetts recorded in accordance with the present invention are played back on conventional recorders the audio output signal is gibberish and conversely, if conventional tapes are played back with the apparatus of the present invention, the resulting audio output is again gibberish.

Fixedly mounted to and downwardly depending from the bottom edge of fixed plate 387 of each of units 301-308 is a printed circuit board 431, that is substantially coplanar with the plate. Printed circuit board 431 carries Dolly amplifiers 378 and 379, which includes appropriate integrated circuit and discrete circuit components, such as resistor 432, capacitor 433 and transformer 434. Printed circuit board 431 also includes a pair of DC input terminals and audio output terminals for the stereophonic signals. An electrical connection exists between the circuitry on the printed circuit board 431 and coils 372-375 in head assembly 388 via switches 376 and 377, included in switch assembly 401. An electrical connection also exists between printed circuit board 301 and motor 371, as well as amplifiers 378 and 379, whereby power is constantly supplied to the motor and amplifiers. The audio output terminals and DC input terminals of printed circuit board 431 are connected via suitable cables to a multi-pin connector 435 at the bottom of an end wall of assembly 371. Connector 435 mates with a second connector (not shown) having terminals connected to one end of a DC power supply cable, having a second end connected to a tap of regulator 311. The connector which mates with connector 435 also has terminals connected to one end of each of coaxial cables 341-348 and 351-358, the other ends of which are connected to switches 361 at the different passenger locations.

Reference is now made to FIGS. 8-17 wherein there are illustrated, in greater detail, the various mechanical components of one of the tape playback units, such as unit 301. Unit 301 is provided with vertically extending cassette loading guides 14, fixedly mounted on plate 387 to receive cassette 478 when it is inserted into unit 301. In response to cassette 478 being pushed into guides 14, the forward edge 380 of the cassette pushes against fingers 24, which are pivotably mounted on fixed plate 387. Fingers 24 are normally biased by springs 25 toward the top of unit 31 so that the fingers are displaced by approximately 60 degrees from the vertical.

Figure 11:
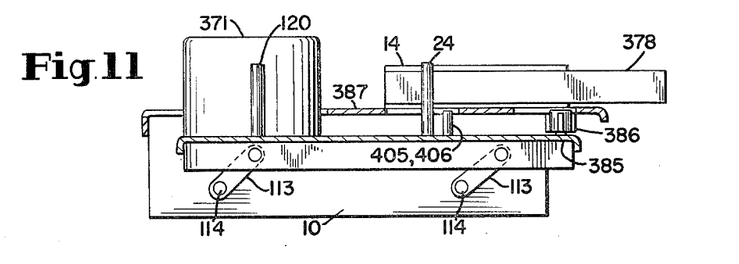
FIG. 11 is a side view of a tape player of a type adapted to be used in connection with the present invention with a rack containing the drive apparatus in the retracted position.
Figure 13:
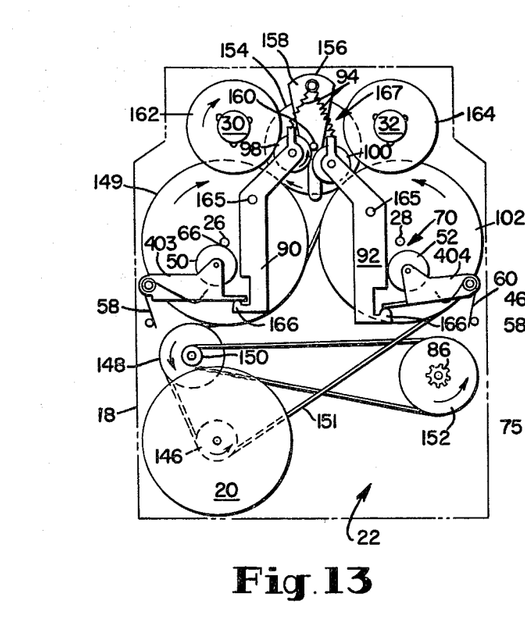
FIG. 13 is a front view of the drive mechanism and activating mechanism for idler rollers utilized in the tape player.

In response to the forward edge 380 of cassette 478 bearing downwardly against fingers 24 against the force of spring 25, rack 385 is translated from the position illustrated at unit 305, and in FIG. 11, to the position illustrated by unit 303 (FIG. 3), and as indicated in FIG. 13.

Pivotable arms 403 and 404, respectively supported on shafts 46 and 48, in turn mounted on fixed plate 387, drive pinch rollers 389 and 390 toward capstans 405 and 406 by springs 58 and 60. One of pinch rollers 389 and 390 is pressed against the corresponding capstan 405 and 406 by swingable arm 64, which is a part of a taper reversal mechanism 62, described infra in connection with FIG. 14, and including reversing gear 399. In response to pinch roller 390 and capstan 408 squeezing the magnetic tape of cassette 478, the magnetic tape is paid from the right hub 395 to the left hub 394, i.e., in the first direction as indicated in FIG. 7a. In response to pinch roller 390 being released from the tape and pinch roller 389 being energized so that the tape is squeezed between it and capstan 405, the tape is driven in the second direction (FIG. 7b), from hub 394 to hub 395.

Mounted on opposite sides of magnetic head assembly 388 are detection units 72, including movable detection rods 392 and 393, which are fitted to fixed plate 387. Detection rods 392 and 393 normally act as tape guides, but are pushed by a tensional force supplied to the tape of cassette 478 when the tape is substantially taken up on one of hubs 394 or 395. In response to one of detection rods 392 and 393 detecting a completely wound condition for the tape on hub 394 and 395, intermediate arm 396 of tape reversal trigger mechanism 80 is rotated about pivot point 396 for activation of the trigger mechanism, thereby initiating operation of reversal control unit 82, described infra in connection with FIGS. 1 and 6. Tape reversal control unit 82 is pivotably supported on auxiliary base plate 84. Control unit 82 is spatially mounted on stationary base plate 387 so it is disposed between the base plate and auxiliary base plate 84. When activated, tape reversal control unit 82 engages a relatively small gear 86 which drives unit 82 by virtue of the connection of the gear to motor 371. Reversing gear 399, having a larger diameter than gear 86, is driven by gear 86 through approximately a half turn to reverse the direction in which the magnetic tape of cassette 478 is driven and to activate slider 400 of switch 401 which includes contacts 376 and 377. Details of the apparatus and of the operations performed by driving gear 399 through a half a turn are described infra.

Figure 9:
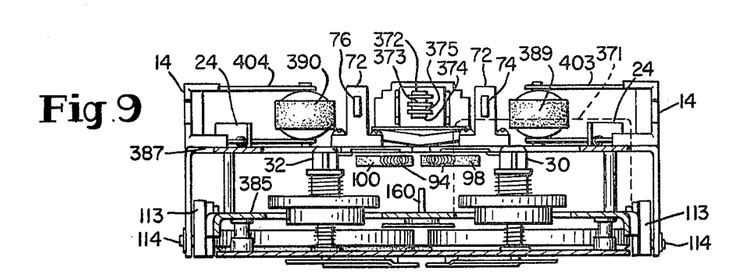
FIG. 9 is a front view of a tape player unit utilizing the present invention, with a rack containing drive elements in a retracted position.
Figure 10:
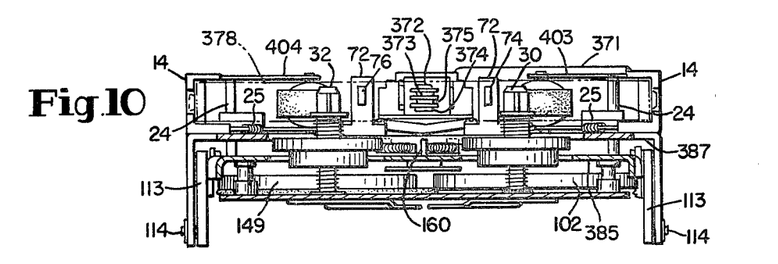
FIG. 10 is a top view of the tape player with the rack containing the drive mechanism in an operative position.

As illustrated in FIGS. 9 and 10, stationary head assembly 388 includes four stationary magnetic pole pieces for coils 372-375. The two upper coils 372 and 373 are connected by switch contacts 376 and 377 as the cassette tape is being transported from right to left, while the two lower coils 374 and 375 are connected to the amplifiers in response to the tape being transported from left to right. The pole pieces for coils 372-375 lie in mutually parallel planes between the side edges of unit 301.

Figure 8:
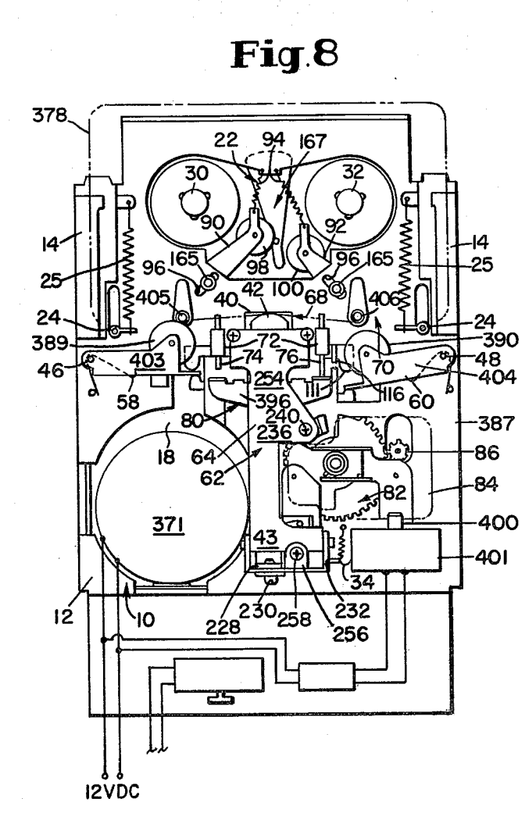
FIG. 8 is a front view, in greater detail, of a unit in accordance with the present invention.

Changeover legs 90 and 92, FIGS. 8 and 13, are pivotably mounted on the face of stationary plate 387 adjacent movable rack 384 on pins 165. Legs 90 and 92 slide along shafts secured thereon and which engage elongated slots 96 (FIG. 8) in stationary plate 387. Changeover legs 90 and 92 incude first and second intermediate rollers 98 and 100 which selectively engage rollers 162 and 164 on which are mounted spindles 386 for cassette hubs 394 and 395. Rollers 98 and 100 are mounted adjacent upper edges of changeover legs 90 and 92, which are normally urged upwardly by springs 94. In response to swingable arm 64 of the tape reversal mechanism 62 being rotated, one of changeover legs 90 or 92 projects upwardly, as described infra with regard to FIG. 13. The upwardly urged changeover leg 90 or 92 rotates its corresponding spindle 386, to drive one of hubs 394 or 395. The cassette hub which is driven at this time has its rotation affected by the capstan against which the pinch roller is not pressed. In FIG. 8, the magnetic tape is illustrated as traveling to the right side in response to engagement between capstan 389 and pinch roller 405. The spindle which drives roller 394 is in turn driven by flywheel 102 (FIG. 13) fitted to capstan 406.

Movable rack 395 is translated and rotated downwardly and to the left, as viewed in FIG. 3, to couple the cassette 478 loaded between guides 14 with both capstans 405 and 406, and both spindles 386. Spindles 386 are maintained in engagement with toothed hubs 394 and 395 in response to the force applied to cassette 478 by hold-down bar 476 when top 472 is held in the downward position by screws 412. As indicated by FIG. 6, tape reversal control unit 82 is put into operation in response to tape reversal trigger mechanism 80 being moved rearward relative to carrier plate 40, as described infra.

The general internal arrangement and operation of unit 301 has now been described by reference to FIGS. 4, 8 and 14.

Detailed consideration will now be given to the apparatus and operation of tape playback unit 301. The mechanism and operating conditions for translating rack 385 relative to plate 387 are illustrated in detail in FIGS. 9–12. As indicated in FIGS. 9 and 11, when cassette 478 is initially loaded between guides 14, and prior to contact with arms 24, rack 385 is in a position relatively remote from plate 387. In response to cassette 478 being pushed downwardly so that is engages arms 24, rack 385 is translated toward plate 387. Rack 385 is carried downwardly and to the left, as viewed in FIG. 3, by links 113 which are pivotally mounted on studs 114, secured to the side of frame 10, to which plate 387 is also connected. Accordingly, rack 385 is obliquely shifted to a point in proximity to stationary plate 387. Capstans 405 and 406, projecting from rack 385, as well as spindles 386, are thereby translated into hubs 394 and 395 and bores 408 of cassette 478. Two hubs 394 and 395, as well as bores 408, capture spindles 386 and capstans 405 and 406, to maintain rack 385 in situ, as long as cassette 478 is maintained in place by hold-down or retaining bar 474. In response to cover 472 being lifted and removal of hold-down bar 474, springs 25 have a tendency to urge rack 385 upwardly so that cassette 478 can easily be grasped by an operator. As the operator grasps cassette 478, arms 113 pivot about studs 114 to enable withdrawal of spindles 386 from hubs 394 and 395 and withdrawal of capstans 405 and 406 from bores 408.

The drive for spindles 386 and capstans 405 and 406 is taken from the shaft of motor 20, fitted to movable rack 378. The shaft of motor 371 extends to the right, as viewed in FIG. 3, away from rack 385, and is provided with pulley 146. Pulley 146 drives belt 151, which in turn drives pulley 148, rotatably mounted on rack 385. Pulley 151 also drives a first flywheel 149, fitted to capstan 405, as well as a second flywheel 102, fitted to capstan 406. A small pulley 150, integrally formed with pulley 148, drives pulley 152 through belt 151. Integral with pulley 152 is gear 86, which drives reversing gear 399, as described in greater detail infra. Swingable pulley 154, pivotably supported on lever 158, in turn swingable about pivotal shaft 156 on rack 385, is selectively driven by one of flywheels 102 or 149, depending upon the positions of legs 90 and 92, as illustrated in FIG. 13. Swingable lever 158 carries a shaft 160 which projects from rack 385 toward plate 387.

Spindles 386 on the left and right sides are respectively fitted with drive rollers 162 and 164. Drive rollers 162 and 164 are respectively and selectively driven by intermediate rollers 98 and 100, mounted at the upper ends of changeover legs 90 and 92 respectively.

Changeover legs 90 and 92 slide back and forth obliquely over the side of stationary plate 387 facing rack 385. To this end, changeover legs 90 and 92 carry shafts 165 which fit through elongated slots 96 in stationary plate 387. Intermediate rollers 98 and 100 are rotatably fitted to studs in proximity to the lower ends of changeover legs 90 and 92. Changeover legs 90 and 92 are urged downwardly by springs 92, stretched between the downwardmost portions of the changeover legs 90 and 92 and stationary base plate 387. In response to rack 385 being pushed downwardly into a fully set position, the constituent members of the tape drive mechanism, mounted on the right side of rack 385, cooperate with the drive mechanism fitted on the right side of stationary base plate 387 to drive the tape of cassette 478.

Figures 14, 15, 16, 17:
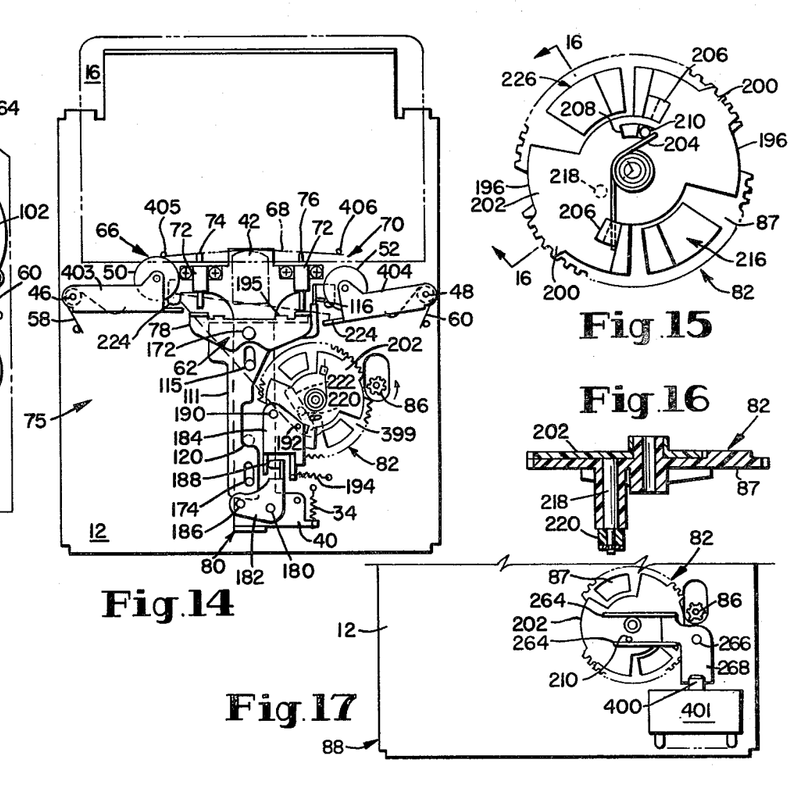
FIG. 14 is a plan view of details for controlling the pinch roller and activation of the playback unit to amplifiers.
FIG. 15 is a plan view of a portion of the mechanism illustrated in FIG. 14.
FIG. 16 is a side view taken through the lines 16—16, FIG. 15.
FIG. 17 is a further plan view of a portion of a unit, particularly of a switch for controlling connections between the head and amplifier.

In response to swingable arm 64 of the tape reversal mechanism 62, FIGS. 8 and 14, rotating clockwise, arm 54 swings counterclockwise about stud 46. Then, finger 166 (FIG. 13), formed at the bottom end of changeover leg 90 is translated upwardly through elongated slot 96 (FIG. 8). As a result, the first intermediate roller 98 pushes shaft 160, causing swingable pulley 154 to engage flywheel 102, whereby shaft 160 is connected to drive roller 162. As a result, rotation of the second flywheel 102, fitted to capstan 406, is not coupled to pinch roller 390, but is transmitted to the left spindle 386.

In response to arm 64 of the tape reversal mechanism 62 swinging counterclockwise, the second changeover leg 92 is urged downwardly and the rotation of the first flywheel 149 is transmitted to the right spindle 386. Swingable roller 154, as well as first and second intermediate rollers 98 and 100, and shaft 160 thereby form an intermediate pulley means 167 that establishes selective connection between capstans 405 and 406 and the left and right spindles 386, which respectively drive cassette hubs 394 and 395.

Figure 12:
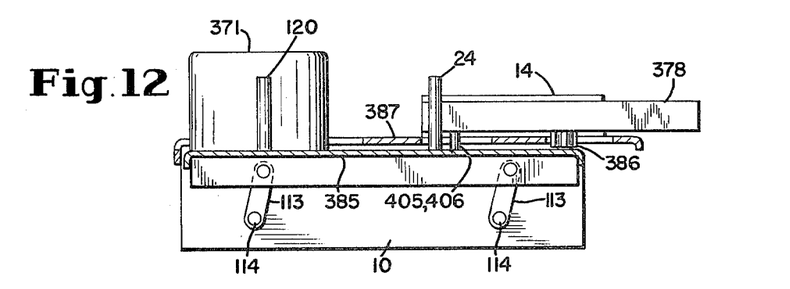
FIG. 12 is a side view of a tape player utilized with the present invention wherein the rack containing the drive mechanism is in the operative position.

In response to movable rack 385 being activated to a set position, as illustrated in FIGS. 10 and 12, capstans 405 and 406 and both spindles 386 are fitted into cassette 478. Relatively small gear 86 of tape reversal mechanism 62 is translated to a position enabling it to cooperate with tape reversal control unit 82 (FIGS. 8 and 14).

Consideration is now given to end of reel detection units 72 and tape reversal trigger means 80, by referring to FIGS. 8 and 14. End of tape detection units 72 are mounted on carrier plate 40 and include detection rods 392 and 393. Detection rods or arms 392 and 393 are mounted so that they are capable of sliding vertically, at right angles to the direction of tape movement past head assembly 388.

Tape reversal trigger mechanism 80 includes an intermediate arm 396 which is driven downwardly when pushed by detection arms 392 and 393. Trigger mechanism 80 also includes leg 398, included on support plate 33, and connected to intermediate arm 396 so that leg 398 can rotate about shaft 172 and slide forward and rearward of an inserted cassette with guide studs 115 and 174, which are erected on carrier plate 40. Mechanism 80 also includes an engagement lever 184 that is interlockingly operated with rotatable cam 182 and is pivotably supported by auxiliary base plate 84.

In response to intermediate arm 386 being pushed backward when the tape in the cassette is substantially fully taken up on hub 394 or 395, the intermediate arm, together with connection plate 111, is translated downwardly relative to carrier plate 40, which remains stationary at this time. The forward end of leg 398 drives rotatable cam 182 counterclockwise by engaging pin 186, provided on one of the arms of cam 182, fitted to carrier plate 40.

An upwardly extending arm of rotatable cam 182 is provided with a push shoulder 188. Engagement lever 184 is pivotably supported by shaft 190, erected on auxiliary base plate 84. When moved to the left side of FIG. 14 in response to counterclockwise rotation of rotatable cam 182, push shoulder 188 is rotated clockwise. The clockwise rotation of push shoulder 188 causes engagement pin 192, fitted to engagement lever 184, to rotate clockwise about shaft 190. As a result, tape rotation control unit 182, which has been maintained in an inoperative condition until this point by means of engagement pin 192, starts to operate. The triggering action of tape reversing trigger mechanism 80 begins when leg 398 is translated downwardly relative to carrier plate 40. When the tape in cassette 478 has been reversed in direction and there is decrease in tension on the tape, spring 194 causes rotatable cam 182, engagement lever 184, leg 398 and intermediate arm 396 to regain the positions they occupied before the tape was fully wound on one of hubs 394 or 395.

Even when the cassette tape is not fully wound on one of hubs 394 or 395, changes occur in the tape tension, due to various causes. For example, changes in the tape tension may arise due to uneven forces being applied to detection fingers 392 and 393. With the tape reversal trigger means 80 used in the device of the present invention, the forward end portion of intermediate arm 396 is provided with the two outwardly projecting bends 195, slightly spaced from the forward end portion of connection plate 111. This slight space in between bends 195 and the edge of connection plate 111 allows arm 396 to rotate slightly about pivot stud 397. The rotation of arm 396 occurs by the action of the arm itself, even when the arm is pushed by fingers 392 and 393 with unequal forces by unequal tensions occurring on the cassette tape, thereby preventing reversal of the tape drive direction, for example, by displacement of connection plate 111.

There is now described, in connection with FIGS. 14–16, the mechanism and operation of tape reversal control unit 82. Tape reversal control unit 82 includes a rotatable, relatively large gear 399, having two concave step portions 196, spaced from each other by a distance corresponding to a circumferential angle of 180 degrees. Each of the concave step portions 196 has a length equal to several teeth of gear 399. In addition, an auxiliary rotatable gear 202, disposed concentrically with gear 399, has two tooth portions 200 spaced from each other by a circumferential angle of 180 degrees; gear 20 rotatably drives gear 399. Each of tooth portions 200 is provided with a number of teeth, having an extent which corresponds to the length of concave step portion 196.

Tape reversal control unit 82 also includes a spring 204 for urging the two tooth portions 200 toward concave stop portions 196, to bring about a first condition in which the two tooth portions 200 overlap the two concave stop portions 196. Spring 204 is stretched between one of a pair of engagement projections 206, provided on auxiliary gear 202. Engagement projections 206 are spaced from each other by a distance corresponding to a circumferential angle of 180 degrees. Actuating pin 210, erected on gear 399, projects through an elongated arcuate slot 208 in auxiliary gear 202. The surface of gear 399 is provided with stops, in the form of cams 216 and 226, for bringing auxiliary gear 202 to rest at a predetermined position, to stop both auxiliary gear 202 and larger gear 399 in the first condition. Cams 216 and 226 have raised surfaces to engage radially extending edges of auxiliary gear 202. In FIG. 15 is illustrated a second condition in which toothed portions 200 of auxiliary gear 202 are fully removed from concave stop portions 196 of gear 399 by applying a force between the auxiliary gear and the larger gear 399, against the force of spring 204.

The relatively small, rotation initiating gear 86, which rotates counter clockwise, as indicated in FIGS. 13 and 14, is positioned to selectively engage larger reversing gear 399 and auxiliary gear 202. If it is assumed that gear 86 passes over one of the concave stop portions 196 to engage reversing gear 399, then both the reversing gear and auxiliary gear remain in the first condition, to continue clockwise rotation. If, in this case, one of the engagement projections 206 of auxiliary gear 202 is pressed against engagement pin 192, provided on tape reversal trigger mechanism 80, auxiliary gear 202 stops rotating. Thereafter, only relatively large reversing gear 399 continues rotation against the force of spring 204 in response to being driven by gear 86. As a result, one of the concave stop portions 196 comes to rest at a location facing small gear 86, whereby tape reversal control unit 82 is activated to the second condition.

In response to engagement pin 192 being released from engagement projection 206 when the cassette tape is substantially fully taken up on one of hubs 394 or 395, auxiliary gear 202 rotates slightly clockwise in response to the action of spring 204. The slight rotation of auxiliary gear 202 activates tapes reversal control unit 82 into the first condition. In consequence, small gear 86 engages one of the toothed portions 200 of auxiliary gear 202 to rotate gear 202 in a clockwise rotation. Clockwise rotation of auxiliary gear 202 is transmitted to reversing gear 399 through stopping cams 216 and 226. Cams 216 and 226 are designed to maintain gears 399 and 202 in the first condition. Eventually, reversing gear 399 engages the small driving gear 86 and continues to rotate clockwise.

The next reversing operation is performed in the same manner as described previously. Tape reversal control unit 82 comes to rest after making a half rotation each time the cassette tape is substantially fully wound on hub 394 or 395.

Further reference is now made to FIGS. 8, 14, 15 and 16 for details of the construction and operation of tape reversal mechanism 62, designed to reverse the direction of motion of the tape each time tape reversal control unit 82 makes a half revolution. Tape reversal mechanism 62 comprises an engagement stud 218 extending at right angles from gear 399 in a direction opposite from auxiliary gear 202. Mechanism 62 also includes roller 220, rotatably fitted to the end of shaft 218 remote from gears 202 and 399, and swingable arm 64. Swingable arm 64 extends to a point close to pinch rollers 389 and 390. Extending transversely from the top of swingable arm 64 is a pair of shoulders, each of which carries a downwardly depending finger 224. One of fingers 224 engages one of arms 403 or 404 which respectively carry pinch rollers 389 and 390. In response to reversing gear 399 rotating clockwise to a maximum extent, swingable arm 64 is driven so that finger 224 on the left side thereof projects downwardly to a greater extent than finger 224 on the right side of arm 64, which is driven to an upward position. Arm 404 is thereby driven downwardly by the right side actuating finger 224 of swingable arm 64, to release the second tape drive unit 70. The first swingable arm 403 is removed from the left side actuating finger 224 of swingable arm 64 and is rotated counterclockwise by spring 58. In consequence, the constituent members of the first tape driving unit 66 are coupled together, causing the cassette tape to run to the left, that is in a first direction.

After the cassette tape has run in the first direction, from right to left, and is substantially fully taken up on hub 394, and gear 399 is brought to rest after making one half turn, swingable arm 64 swings counterclockwise to the greatest extent. Therefore, in a manner similar, but opposite to the previously mentioned situation, the constituent members of only the second tape driving unit 70 are coupled together. When the second tape drive unit members are coupled together the cassette tape travels from left to right, i.e., in a second direction. When the clockwise or counterclockwise rotation of swingable arm causes the cassette tape to run in the first and second directions, the first hub 394 and the second hub 395 are respectively driven, as described supra.

Consideration is now given to the mechanism for controlling contacts 376 and 377 in switch 401. Switch 401 includes a slideable toggle 461, which controls the positions of contacts 376 and 377. The position of slider or toggle 61 is controlled by the angular position of pin 200, erected on gear 399. Pin 210 selectively engages parallel, rigid arms 264 which is carried by actuating lever 268 for slider 400. Actuating lever 268 rotates about stud 266, erected on stationary plate 387. One of the arms 264 of actuating lever 268 swings to the right or left each time gear 399 makes a half turn. In response to the swinging of arms 264, slider 400 is driven to the left or to the right, to establish the two positions for contacts 376 and 377 within switch 401.

While there has been described and illustrated one specific embodiment of the invention, it will be clear that variations in the details of the embodiment specifically illustrated and described may be made without departing from the true spirit and scope of the invention as defined in the appended claims.

We claim:

1. A method of preventing playback and tending to prevent pilfering of multi-track audio magnetic tape cassettes normally prerecorded and played back so that first and second audio tracks go along the tape in a first longitudinal direction and third and fourth audio tracks go along the tape in a second direction opposite from the first direction, the four tracks being parallel to each other, the tracks normally played back in first conventional playback devices by first, second, third and fourth track head pole pieces, the first and second track head pole pieces being simultaneously coupled to an audio output device and then the third and fourth track head pole pieces being simultaneously coupled to the audio output device so that the first and second track head pole pieces are initially coupled to the output device while the first and second tape tracks are moving in the first direction past the first and second track head pole pieces and the third and fourth track head pole pieces are subsequently coupled to the output device while the third and fourth tape tracks are moving in a second direction past the third and fourth track head pole pieces, the tape tracks normally played back in second conventional playback devices by first and second track head pole pieces simultaneously coupled to an audio output device while the first and second tape tracks are moving in a first direction past the first and second track head pole pieces with one face of the cassette in an upward position, the first and second track head pole pieces simultaneously coupled to the output device while the fourth and third tape tracks are moving in a second direction, opposite to the first direction, past the first and second track head pole pieces with said one face in a downward position, the improved method comprising recording the first and second audio tracks of a cassette in the second direction and recording the third and fourth audio tracks of the cassette in the first direction, whereby playback of the cassette by either of the first or second conventional playback devices results in an audio message of gibberish.

2. The method of claim 1, further including the steps of playing back the four tracks of the cassette with first, second, third and fourth track head pole pieces, initially moving the first and second tape tracks in the second direction past the first and second track head pole pieces while the first and second track head pole pieces are simultaneously coupled to an output device and subsequently moving the third and fourth tape tracks in the first direction past the third and fourth track head pole pieces while the third and fourth track head pole pieces are simultaneously coupled to the output device.

3. A multi-track, audio magnetic tape cassette which, when played back with normal playback equipment produces gibberish, said cassette being of a type normally prerecorded and played back so that first and second audio tracks go along the tape in a first longitudinal direction and third and fourth audio tracks go along the tape in a second direction opposite from the first direction, the four tracks being parallel to each other, the tracks normally played back in first conventional playback devices by first, second, third and fourth track head pole pieces, the first and second track head pole pieces being simultaneously coupled to an audio output device and then the third and fourth track head pole pieces being simultaneously coupled to the audio output device so that the first and second track head pole pieces are initially coupled to the output device while the first and second tape tracks are moving in the first direction past the first and second track head pole pieces and the third and fourth track head pole pieces are subsequently coupled to the output device while the third and fourth tape tracks are moving in a second direction past the third and fourth track head pole pieces, the tracks normally played back in second conventional playback devices by first and second track head pole pieces simultaneously coupled to an audio output device while the first and second tape tracks are moving in a first direction past the first and second track head poles pieces with one face of the cassette in an upward position, the first and second track head pole pieces simultaneously coupled to the output device while the fourth and third tape tracks are moving in a second direction opposite to the first direction, past the first and second track head pole pieces with said one face in a downward position, the improved cassette comprising first and second audio tracks recorded in the second direction and located in the same position on the tape of a normal cassette, and third and fourth audio tracks recorded in the first direction and located in the same position on the tape as the third and fourth tracks on the tape of a normal cassette.

4. The cassette of claim 3, wherein the cassette is of the Philips type with a Philips type casing, said casing including two transverse apertures for drive spools and two transverse apertures for capstans, and a further transverse aperture for receiving a retaining bar of the playback device.

5. The cassette of claim 4 wherein the further aperture is on an edge of the cassette opposite an edge having an aperture through which a head of the playback device projects as the tape is played back.

6. A tape playback assembly enabling continuous drive of several tapes and playback selection of the tapes by multiple listeners comprising a plurality of playback units for Philips type cassettes, each of said cassettes including a casing having a pair of hubs on which tape is wound, said casing having a first pair of transverse apertures into which the hubs extend and a second pair of transverse apertures for receiving a pair of capstans, a housing in which all of said units are fixedly mounted, each of said units including:
a region for receiving one of said cassettes,
means for enabling cassettes to be inserted into and removed from the region,
drive reels into which the hubs fit,
a pair of capstans which fit into the second pair of apertures,
a drive motor connected to drive the reels,
means for reversing the drive direction of the reels by the motor in response to the tape being wound substantially completely on one of the hubs so that the tape is driven at normal playback speed in both directions,
a playback head assembly positioned to engage the tape when the cassette is in the region,
a pair of pinch rollers, one on each side of the head,
means for urging one of said pinch rollers into engagement with one side of the tape during playback, the pinch rollers and capstans being positioned so that the tape is squeezed between them,
said head assembly including at least first and second magnetic flux to audio signal transducers, said first and second transducers positioned to transduce first and second audio tracks of the tape, the first and second tracks being recorded so that the audio information is derived from them in response to the tape being driven at normal playback speed in first and second directions,
an audio amplifier connected to be responsive to the signals transduced by the transducers,
a switch for connecting the first transducer to the amplifier in response to the tape being driven in the first direction and for connecting the second transducer to the amplifier in reponse to the tape being driven in the second direction;
an audio cable having a separate lead connected to be responsive to an audio signal derived from each of the amplifiers, a plurality of audio output devices and separate switch means for each of the output devices, each of said switch means including means for selectively connecting the leads to the output device so one of the leads is connected to the output device at a time.

7. The tape playback assembly of claim 6, wherein each unit includes spring means tending to urge the cassette out of the region, the units being positioned in side by side relation with each other in the housing so that the cassettes, while loaded in the units, are transverse to a longitudinal axis of the housing, the housing including a retaining bar extending in the longitudinal axis direction across a plurality of the units for simultaneously urging the cassettes of each unit into the region of its associated unit during playback to overcome the tendency of the spring means to urge the cassettes out of the regions.

8. The tape playback assembly of claim 6, wherein the units are positioned in side by side relation with each other in the housing so that the cassettes, while loaded in the units, are transverse to a longitudinal axis of the housing, the housing including a retaining bar extending in the longitudinal axis direction across a plurality of the units for simultaneously urging the cassettes of each unit into the region of its associated unit during playback.

9. The tape playback assembly of claim 7 or claim 8, wherein each of the cassettes includes a transverse notch on an edge remote from an edge having an aperture through which the head assembly projects during playback, said retaining bar mating with the notch so that the bar cannot bear down on the cassettes which include the notch and cannot be closed and hold the cassettes in the region during playback if a cassette without the notch is inserted into any of the units.

10. The tape playback assembly of claim 6, wherein the first and second transducers are transversely aligned relative to the tape longitudinal axis, the cassettes, switch, motor and transducers being arranged so that the audio information is derived from the first track in response to the tape being driven in the first direction from right to left when the cassette is inserted into the region and played back, and audio information is derived from the second track in response to the tape being driven in the second direction from left to right when the cassette is inserted into the region and played back, the transducers and tracks being arranged so that when the tape is inserted into the region and played back, the first track is parallel to and below the second track.

11. The tape playback assembly of claim 10, wherein each unit includes spring means tending to urge the cassette out of the region, the units being positioned in side by side relation with each other in the housing so that the cassettes, while loaded in the units, are transverse to a longitudinal axis of the housing, the housing including a retaining bar extending in the longitudinal axis direction across a plurality of the units for simultaneously urging the cassettes of each unit into the region of its associated unit during playback.

12. The tape playback assembly of claim 11, wherein each of the cassettes includes a transverse notch on an edge remote from an edge having an aperture through which the head assembly projects during playback, said retaining bar mating with the notch so that the bar cannot bear down on the cassettes which include the notch and cannot be closed and hold the cassettes in the region during playback if a cassette without the notch is inserted into any of the units.

13. The tape playback assembly of claim 12, wherein the notch and bar are asymmetrical to the cassette so that during playback the cassettes must be inserted into the region with the first track below the second track and insertion of the cassettes into the region in the wrong direction causes the retaining bar to engage an unnotched portion of the cassette to prevent closure of the retaining bar.

14. The tape playback assembly of claim 6, wherein each of the units includes a retainer for holding the cassettes in situ relative to the head assembly, a rack on which are mounted said drive reels and capstans, said rack being pivotable relative to the retainer and head assembly so that the drive reels and capstans are pivoted away from the cassettes as the cassettes are slid into and removed from the retainer to enable insertion of the cassettes into the rack without interference from the drive reels and capstans.

15. A playback unit for a multi-track, audio magnetic tape cassette which, when played back with normal playback equipment produces gibberish, said cassette being of a type normally prerecorded and played back so that first and second audio tracks go along the tape in a first longitudinal direction and third and fourth audio tracks go along the tape in a second direction opposite from the first direction, the four tracks being parallel to each other, the tracks normally played back in first conventional playback devices by first, second, third and fourth track head pole pieces, the first and second track head pole pieces being simultaneously coupled to an audio output device and then the third and fourth track head pole pieces being simultaneously coupled to the audio output device so that the first and second track head pole pieces are initially coupled to the output device while the first and second tape tracks are moving in the first direction past the first and second track head pole pieces and the third and fourth track head pole pieces are subsequently coupled to the output device while the third and fourth tape tracks are moving in a second direction past the third and fourth track head pole pieces, the tracks normally played back in second conventional playback devices by first and second track head pole pieces simultaneously coupled to an audio output device while the first and second tape tracks are moving in a first direction past the first and second track head pole pieces with one face the cassette in an upward position, the first and second track head pole pieces simultaneously coupled to the output device while the fourth and third tape tracks are moving in a second direction, opposite to the first direction, past the first and second track head pole pieces with said one face in a downward position, the cassette for use in the playback unit including first and second audio tracks recorded in the second direction and located in the same position on the tape as the first and second tracks on the tape of a normal cassette, and third and fourth audio tracks recorded in the first direction and located in the same position on the tape as the third and fourth tracks on the tape of a normal cassette, said unit including means for driving the tape in the second direction while the first and second track head pole pieces of the first type of conventional playback device are energized and for driving the tape in the first direction while the third and fourth track head pole pieces of the conventional playback device are energized, and means for automatically reversing the direction of tape drive in response to the tape being fully wound on either hub of the cassette.

16. A playback unit for a multi-track, audio magnetic tape which, when played back with normal playback equipment produces gibberish, said tape being of a type normally prerecorded and played back so that a first audio track goes along the tape in a first longitudinal direction and a second further audio track goes along the tape in a second direction opposite from the first direction, the first and further tracks being parallel to each other, the tracks normally played back in conventional playback devices by first and further head pole pieces, the first head pole piece being coupled to an audio output device and then the further head pole piece being coupled to the audio output device so that the first head pole piece is initially coupled to the output device while the first tape track is moving in the first direction past the first head pole piece and the further head pole piece is subsequently coupled to the output device while the further tape track is moving in a second direction past the further head pole piece, the tape for use in the playback unit including a first track recorded in the second direction and located in the same position on the tape as the first track on the normal tape, and a further audio track recorded in the first direction and located in the same position on the tape as the further track on the normal tape, said unit including means for driving the tape in the second direction while the first head pole piece of the conventional playback device is energized and for driving the tape in the first direction while the further head pole piece of the conventional playback device is energized, and means for automatically reversing the direction of tape drive in response to the tape being fully wound in either direction.

* * * * *